United States Patent
Derouchie et al.

(10) Patent No.: US 9,600,215 B2
(45) Date of Patent: Mar. 21, 2017

(54) ADDING AND REMOVING DRIVER PACKAGES OF A GROUP OF IMAGE FORMING APPARATUSES

(71) Applicants: Steven Derouchie, Kitchener (CA); James Vopni, Kitchener (CA)

(72) Inventors: Steven Derouchie, Kitchener (CA); James Vopni, Kitchener (CA)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/201,328

(22) Filed: Mar. 7, 2014

(65) Prior Publication Data
US 2015/0254035 A1    Sep. 10, 2015

(51) Int. Cl.
*G06F 3/12* (2006.01)
*G06F 9/44* (2006.01)

(52) U.S. Cl.
CPC .......... *G06F 3/1225* (2013.01); *G06F 3/1204* (2013.01); *G06F 3/1205* (2013.01); *G06F 3/1288* (2013.01); *G06F 9/4411* (2013.01)

(58) Field of Classification Search
CPC .............................. G06F 3/1225; G06F 9/4411
USPC ........................................................ 358/1.15
See application file for complete search history.

(56) References Cited

U.S. PATENT DOCUMENTS

| | | | |
|---|---|---|---|
| 8,332,958 B2* | 12/2012 | Nishimi | H04L 63/08 358/1.14 |
| 8,370,469 B2 | 2/2013 | Wang | |
| 2002/0126322 A1* | 9/2002 | Kadowaki | 358/440 |
| 2004/0249908 A1* | 12/2004 | Valladares | H04L 29/12113 709/221 |
| 2005/0012951 A1* | 1/2005 | Madril et al. | 358/1.13 |
| 2006/0294078 A1* | 12/2006 | Jang | 707/3 |
| 2007/0061803 A1* | 3/2007 | Barrett | 717/178 |
| 2009/0141306 A1* | 6/2009 | Yamada | 358/1.15 |
| 2009/0273801 A1* | 11/2009 | Steele et al. | 358/1.15 |
| 2010/0097650 A1* | 4/2010 | Seo | 358/1.15 |
| 2011/0137979 A1* | 6/2011 | Seo et al. | 709/203 |
| 2012/0327445 A1* | 12/2012 | Kikuchi | G06F 3/1225 358/1.13 |
| 2013/0198329 A1 | 8/2013 | Wang | |
| 2013/0198357 A1 | 8/2013 | Wang | |

* cited by examiner

*Primary Examiner* — Eric A Rust
(74) *Attorney, Agent, or Firm* — Oblon, McClelland, Maier & Neustadt, L.L.P.

(57) ABSTRACT

An apparatus, method, and computer-readable storage medium including displaying a plurality of device groups, each of the plurality of device groups including a plurality of devices, receiving a selection of a device group of the plurality of device groups and a request to add a driver package to the device group, and assigning the driver package to the device group by associating the driver package with the device group.

16 Claims, 19 Drawing Sheets

ADDING AND REMOVING DRIVER PACKAGES OF A GROUP OF IMAGE FORMING APPARATUSES

FIELD

The present application describes an apparatus that adds a driver package to a group of devices. An associated method and computer-readable storage medium are also described.

BACKGROUND

On the end-user side, existing print mechanisms require end-users to know where print servers are located, conduct a network search for printers on the print servers, or know the IP address, model number, etc., and download the correct driver for a printer. These steps are time consuming and frustrating to the end-user who is trying to quickly access a printer to print a document.

On the administrator side, it is time consuming and frustrating to add a driver package to each individual device, especially when the administrator is responsible for many devices.

SUMMARY

An apparatus including processing circuitry to display a plurality of device groups, each of the plurality of device groups including a plurality of devices, receive a selection of a device group of the plurality of device groups and a request to add a driver package to the device group, and assign the driver package to the device group by associating the driver package with the device group.

A method performed by a computing apparatus, the method including displaying a plurality of device groups, each of the plurality of device groups including a plurality of devices; receiving a selection of a device group of the plurality of device groups and a request to add a driver package to the device group; and assigning the driver package to the device group by associating the driver package with the device group.

A non-transitory computer-readable storage medium including computer executable instructions, wherein the instructions, when executed by a computer, cause the computer to perform a method, the method including displaying a plurality of device groups, each of the plurality of device groups including a plurality of devices; receiving a selection of a device group of the plurality of device groups and a request to add a driver package to the device group; and assigning the driver package to the device group by associating the driver package with the device group.

BRIEF DESCRIPTION OF THE DRAWINGS

The disclosure will be better understood from reading the description which follows and from examining the accompanying figures. These figures are provided solely as non-limiting examples of the embodiments. In the drawings:

FIGS. 2-14 illustrate features set forth by the device management system;

DETAILED DESCRIPTION

It must be noted that, as used in the specification and the appended claims, the singular forms "a," "an," and "the" include plural referents unless the context clearly dictates otherwise. Thus, for example, reference to "a device" includes a plurality of devices.

Figure 1:
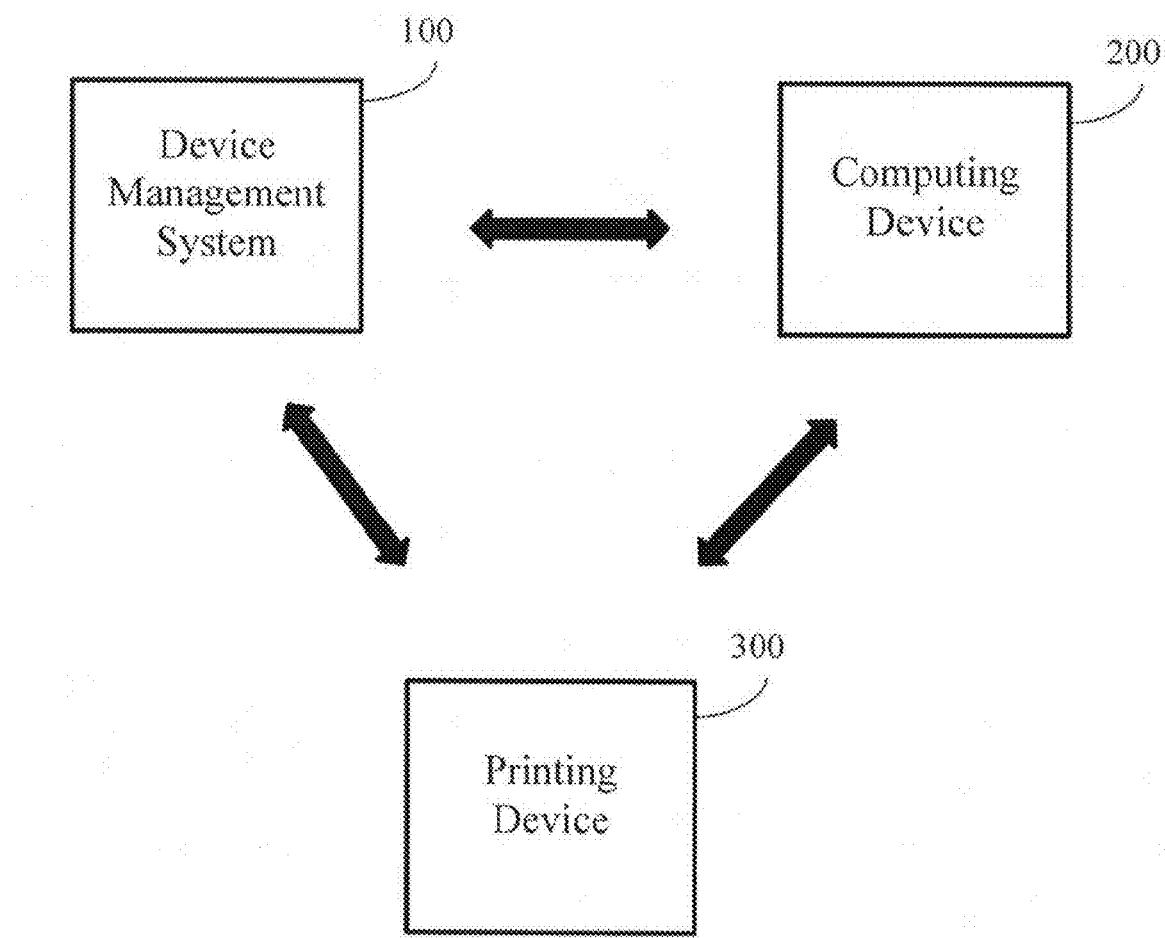
FIG. 1 illustrates a device management system, a computing device, and a printing device.

FIG. 1 shows a device management system 100, a computing device 200, and a printing device 300. As noted above, it is to be understood that there may be a plurality of each of these aforementioned devices. Each of the devices in FIG. 1 may communicate with each other (as is shown by the arrows) via one or more networks (for example, a local area network (LAN) and/or another communications network, such as the Internet).

Figure 18:
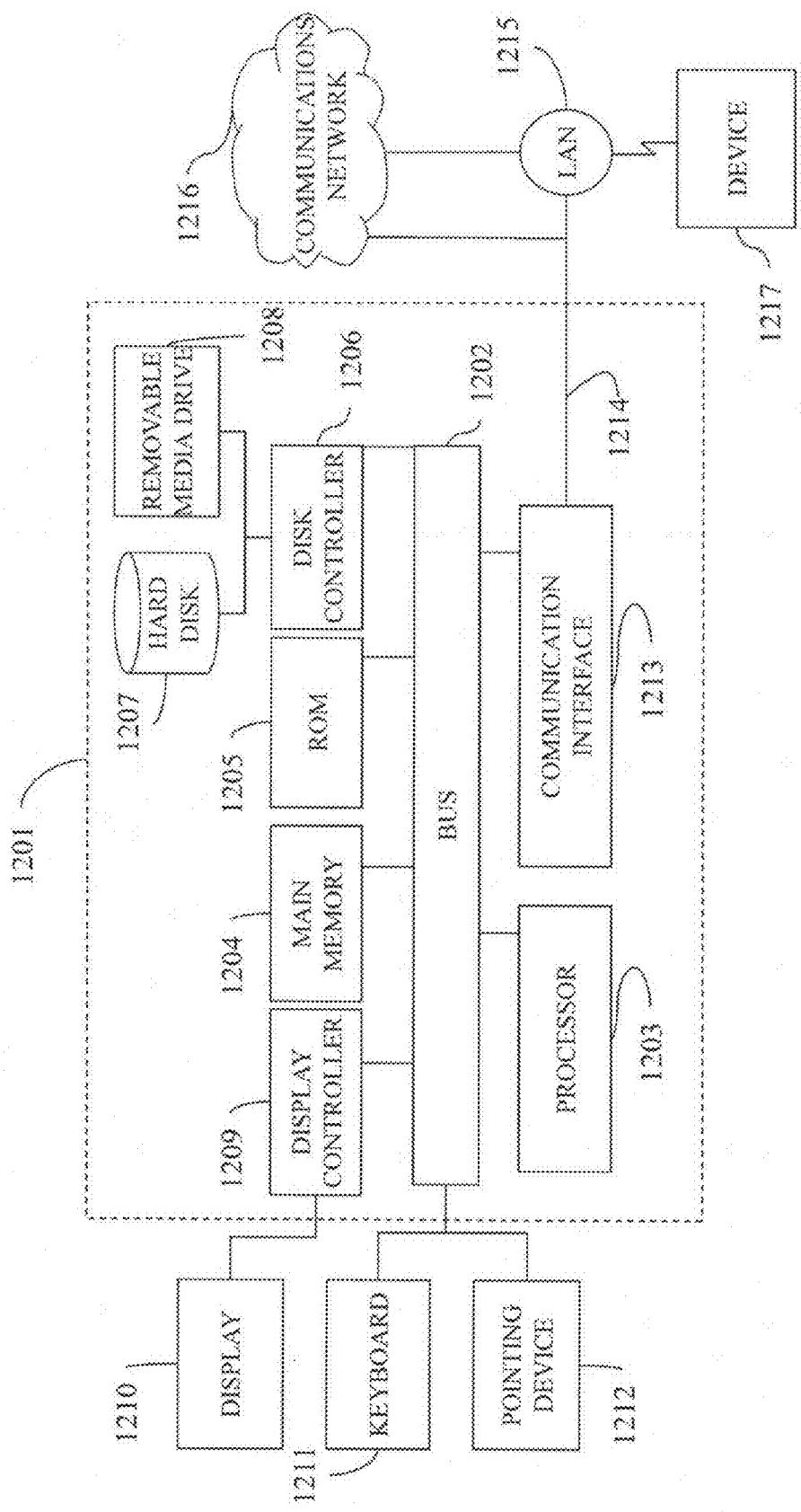
FIG. 18 illustrates a computer system that may be used with embodiments therein.

The device management system 100 may be a server or computer system having a configuration as shown in FIG. 18. Computing device 200 may be a computer (personal computer (PC), laptop, netbook, etc.), which may operate with Apple's operating system, Microsoft's Windows®, Google's Android®, Linux, or other operating system software. Computing device 200 may include the configuration shown in FIG. 18.

The device 200 may also be a cell phone or Smartphone. Cell phones or Smartphones operating with Apples' software, Microsoft's software, RIM's Blackberry® software, or Google's Android® software may be used. These are merely examples, and other cell phone/software combinations may be used. The device 200 may also be a tablet computer device, such as an IPad®. Again, other tablet/software combinations may be used. The device 200 may also be a personal digital assistant (PDA).

The printing device 300 may be a printer or a multi-function peripheral (MFP). Note that "printing device," "device," "printer," and "MFP" are used interchangeably throughout the present disclosure.

With the embodiments discussed herein, administrators can utilize the device management system 100 to create packages that install printers 300 with their drivers. The embodiments discussed herein distribute the driver and configure the connection to the device 200 in one step for the end-user at device 200.

With the embodiments discussed herein, administrators can configure the device management system 100 by uploading print drivers and associating the drivers with specific printers 300 or groups of printers 300. Multiple print drivers can be uploaded for devices in order to support multiple operating systems on devices 200. The printer/driver deployment to workstations can be configured by the administrator using the device management system 100 to either install the printer 300 using a direct connection to the printer 300 or to create a network connection via a shared printer on a print server.

The embodiments discussed herein allow the configuration of devices by the administrator to be performed with greater ease and efficiency. The printer deployment from the device management system 100 allows the administrator to: 1) configure printer deployment directly in the device management system 100; 2) associate multiple print drivers with a device 200 for supporting multiple operating systems; 3) force users who connect to printers via the device management system 100 to connect either directly to the printer or through a print server without the end-user needing to know the details of such connection; 4) set default driver settings such as duplex, monochrome, and finishing options; and 5) allow administrators to configure groups of printing devices 300 using a single compatible driver and settings.

In the device management system 100, drivers are uploaded in order to add the ability for end-users at computing device 200 to use the device management system 100 to find and install printers. The administrator associates the drivers with a printer 300 to enable this functionality. When the administrator configures a driver package to associate with a device 300, the administrator sets how to communicate with the device 300, and default driver settings.

The administrator using the device management system 100 may configure drivers at each individual printer 300, or for groups of printers 300. Where the same driver and settings can be used, the administrator, with the device management system 100, can create the definition at a group level. For example, a group of Ricoh devices can all be configured at a group level to use a Ricoh Universal Print Driver and print to port 9100.

This provides an advantage over individually assigning a driver to each printer. Individually assigning a driver to each printer may be time consuming and frustrating for an administrator. Furthermore, if there is a large number of printers (for example, hundreds or thousands) and each of the printers are individually assigned a driver, then there are hundreds or thousands of individual drivers. This may take up a significant amount of disk space, and additional resources for maintenance. Thus, enabling the functionality of assigning a driver to a group (plurality) of devices saves disk space as well as resources required for maintenance.

Further, the device management system 100 may also limit access of device 200 to particular printers 300. For example, enabling authentication allows the administrator at the device management system 100 to limit the printers 300 available to the end-user at device 200 based on permissions. When an end-user logs into the device management system 100, only the printers 300 available to that user are displayed. A table identifying users and the devices they are permitted to use may be maintained at the device management system 100.

Moreover, the embodiments discussed herein allow users to easily and quickly install printers. When an end-user at device 200 wants to connect to a printer 300, the user accesses the device management system 100 via, for example, a web browser application or application downloaded on device 200. An advantage of using such an application is that it provides ease and flexibility by providing one place to handle all the device needs instead of having multiple tools/applications.

When an end-user at device 200 accesses the device management system 100 for accessing a printer 300, the user can browse a list of devices 300 with the ability to filter devices based on several criteria such as, but not limited to, display name, IP address, serial number, manufacturer, model, location, capabilities/features of the device (duplexing, stapling, folding, etc.), and groupings of devices defined by the administrator.

When an end-user at device 200 decides on the best possible printer based on location, device features, etc., clicking on the device entry may automatically detect the operating system of the end-user's device 200. Based on this information, the appropriate driver is dynamically packaged by the device management system 100 along with the information required for communicating with the printing device 300. The dynamically created package is downloaded to the device 200 of the end-user as an executable. Once the user has downloaded the package, executing the package will: 1) install the print driver; 2) communicate with the printer by either a) connecting to a print share or b) creating a printer port and print queue for communicating with the device; and 3) the end-user can now print documents to the printer 300 from device 200.

This provides an advantage over the typical method of locating a printer and an associated driver, which as noted above, is time consuming and frustrating to the end-user. The embodiments discussed herein provide the advantage of quickly locating a particular printer based on various search options and downloading a driver to quickly and easily access and use the printer.

The device management system 100 stores all information discussed herein including the driver packages, files, URL links, device information, maps, etc. The device management system 100 also communicates with each printing device 300 and receives information (device name, identification (ID), model number, serial number, address, status information, error information, connectivity information, paper levels, toner levels, etc.) from each printing device 300. In one embodiment, the device management system 100 polls each device 300 (for example, via Simple Network Management Protocol (SNMP) and/or custom protocols) for the information. This information may be received by the device management system 100 from each device 300 at predetermined intervals of time. Moreover, the received information may automatically be sorted and stored in respective tables associated with each respective device 300.

FIGS. 2-14 illustrate various functions when accessing the device management system 100. Note that different screens and functions may be accessible depending on whether a user is logged-in as an administrator of the device management system 100 or as an end-user of device 200.

Figure 2:
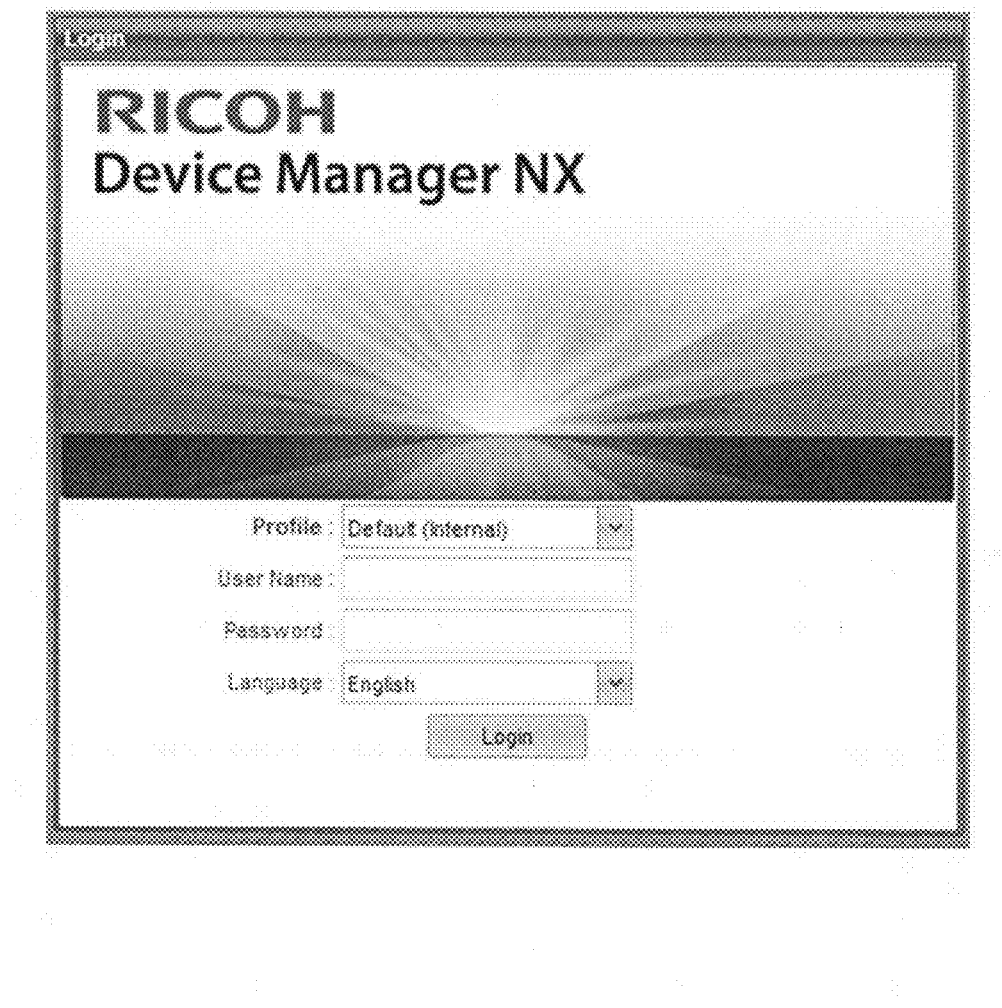

FIG. 2 shows a log-in screen requiring authentication before providing access to the device management system 100. At this log-in screen, the administrator may log-in as an administrator (for example, by selecting the corresponding profile), which again offers additional functionality not available to a non-administrator. If logging-in as a user, successful authenticated users have access to search for all or a limited number of devices and download drivers.

Figure 3A:
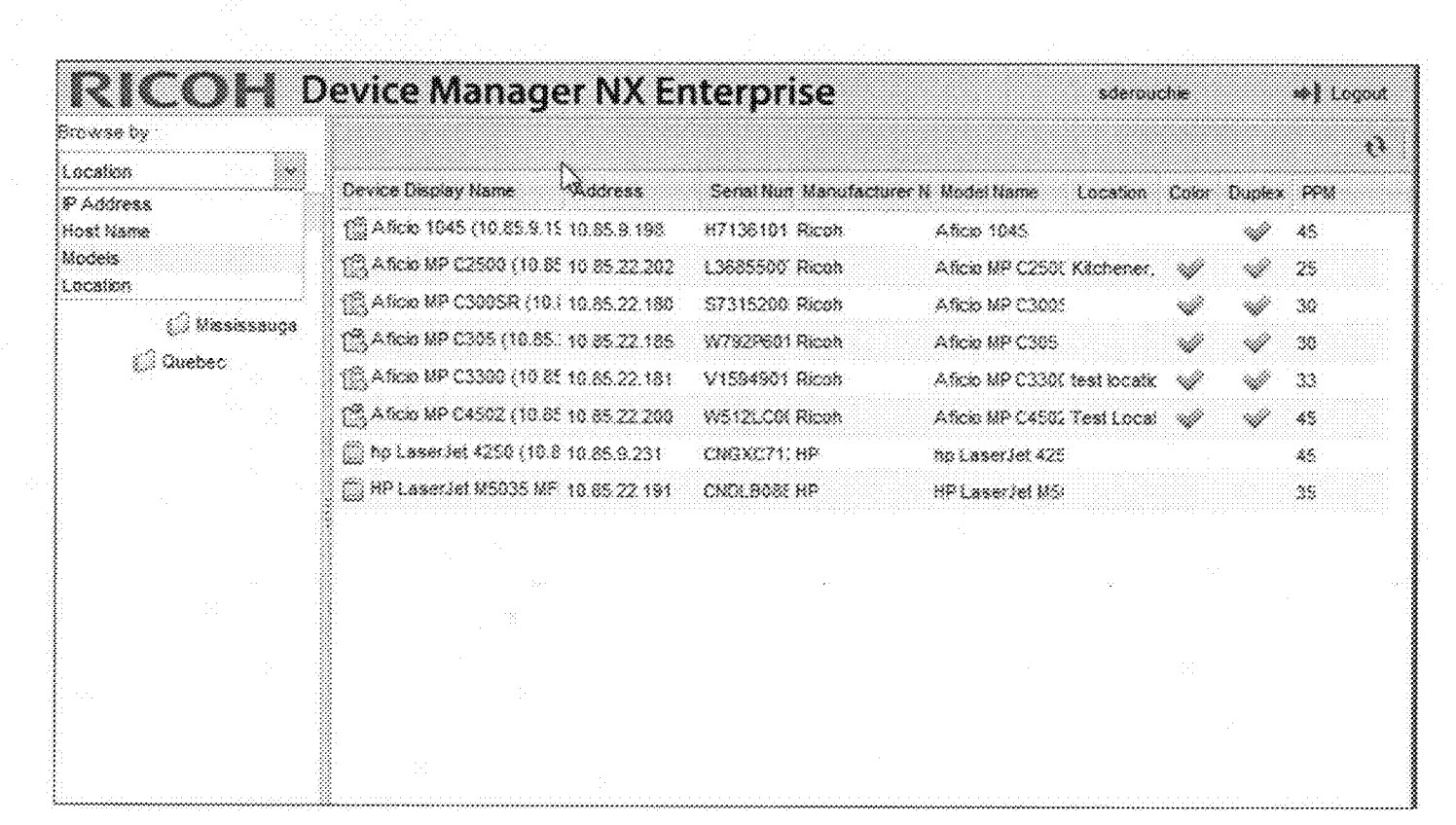
Figure 3B:
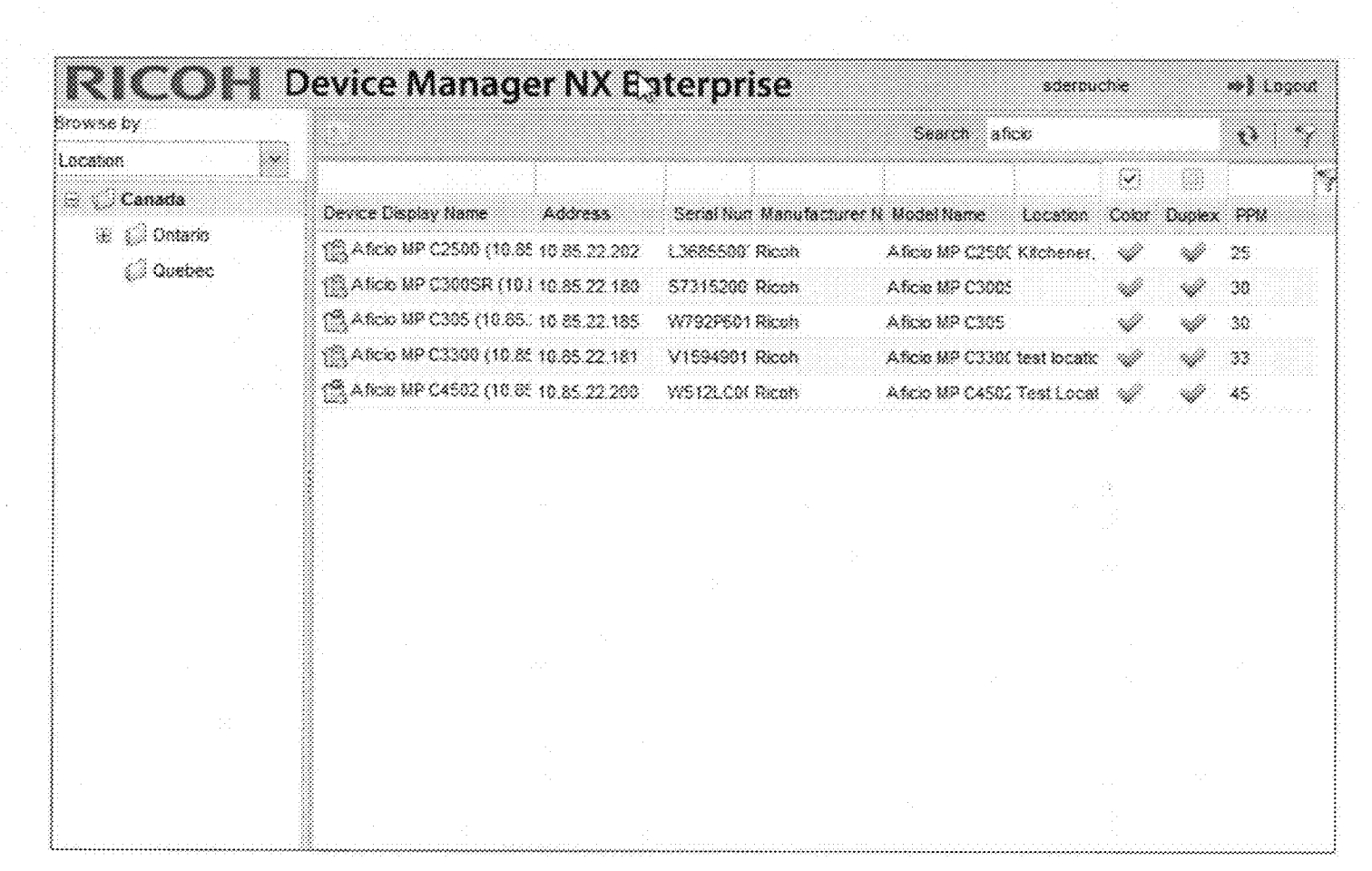

Once logged into the system, a user or administrator may access a driver distribution device list. FIGS. 3A and 3B show examples of such device list. The user or administrator may click on any column header to sort by the column, and can resize one or more of the columns. In one embodiment, the columns and column order are fixed. In one embodiment, the following columns may be displayed: device display name; address; serial number; manufacturer name; model name; Web Image Monitor (WIM) location; color/black & white; duplex; Pages-Per-Minute (PPM). Note that WIM refers to software on printing device 300 that allows to check printer status, manage print jobs, and change settings via a web browser.

In one embodiment, above each column is a quick-filter edit box to allow for fast searching. Further, the groups under the selected category may be shown on the left-side of the screen.

Moreover, a "Browse by" window is displayed on the left-side, which allows browsing by IP address, host name, models, groups, location, etc. A user or administrator may browse through the screens shown in FIGS. 3A and 3B by opening/closing folders and threads. Note that, in one embodiment, all of the aforementioned categories (IP address, host name, models, groups, location, etc.) may be displayed together on the left-side of the screen. This concept is shown, for example, in FIG. 13 below.

Note that devices may be automatically categorized/sorted by the device management system 100 in the "Models" category, based on the information received from each device 100. For example, when a new device is added to the system, the device management system 100 receives model information (for example, model number) from the device 300. The device management system 100 then searches for and determines an already existing group that includes devices with the same model information. Once this group has been determined, the device management system 100 adds the new device to the group.

Similarly, if numerous devices are added to the system, the device management system can sort through the model information of each of these devices and either 1) add each device to an already existing group, or 2) create a new group for the devices with the same model information.

Thus, groups of devices may be created automatically by the device management system 100, or may be customized such that a group includes the devices selected by the administrator.

FIG. 3B illustrates an example of searching for devices using a search box displayed, for example, at the top of the screen. The search box may be used to find devices by device name, address, serial number, manufacturer, model, location package name, or the like. Filtering may also be applied with text searching to further refine the results of the search. As can be seen in the example shown in FIG. 3B, the devices with the name "Aficio" that have color capabilities are displayed as a result of entering "aficio" in the search box and filtering by color (see check placed above the "color" column).

Figure 4:
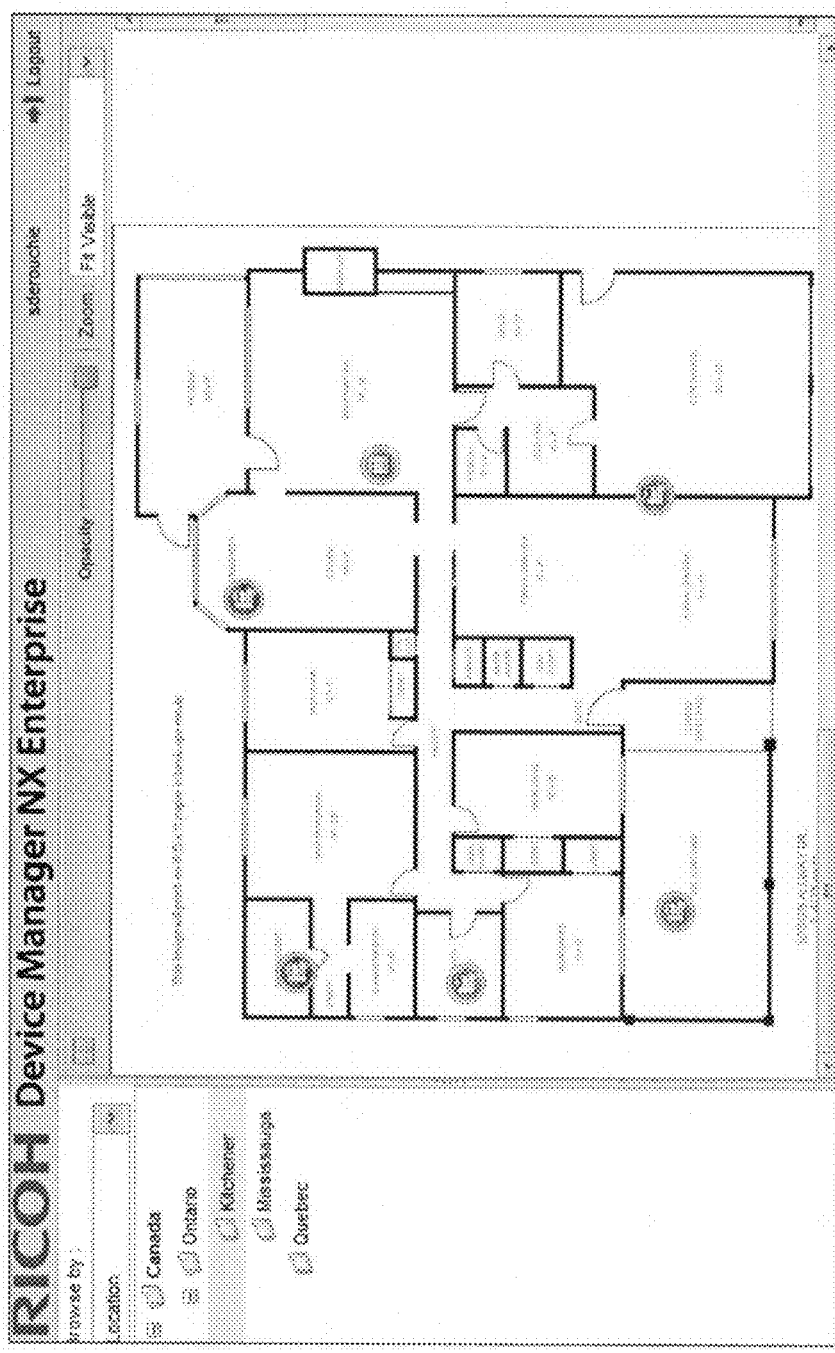

If there is a map associated with the currently selected group, the user or administrator may be able to click on a "Map View" icon (not shown) to display the devices on a floor map, as shown in FIG. 4. In the example of FIG. 4, the floor map for "Kitchener" is displayed.

In this map view, hovering over a device icon may show device information, which may be the same (or additional) information as in the list view shown in FIGS. 3A and 3B. Clicking on a device will cause the device management system 100 to select the device and display a download screen. The screen shown in FIG. 4 also includes a button to control the zoom level of the map image, as well as the opacity. Zoom levels may be provided from 25% to 300%. Additional buttons may include a fit width button and a fit to visible area button.

Note that the device icons are displayed using the same icon as in the device list which reflects the model type (color, MFP, etc.) and are surrounded by an indicator (such as, but not limited to, a circle). The indicator may indicate device status: green=OK; yellow=warning condition; red=error condition; or gray=disconnected. This helps the user or administrator get a quick view of the status of each of the devices.

Once the user or administrator has located the desired device in the device list or map, he or she can select the device by clicking on the respective icon of the device to proceed, as noted above. In one embodiment, in response to selecting a device, the device management system 100 displays a pop-up window over the device list.

Figure 5:
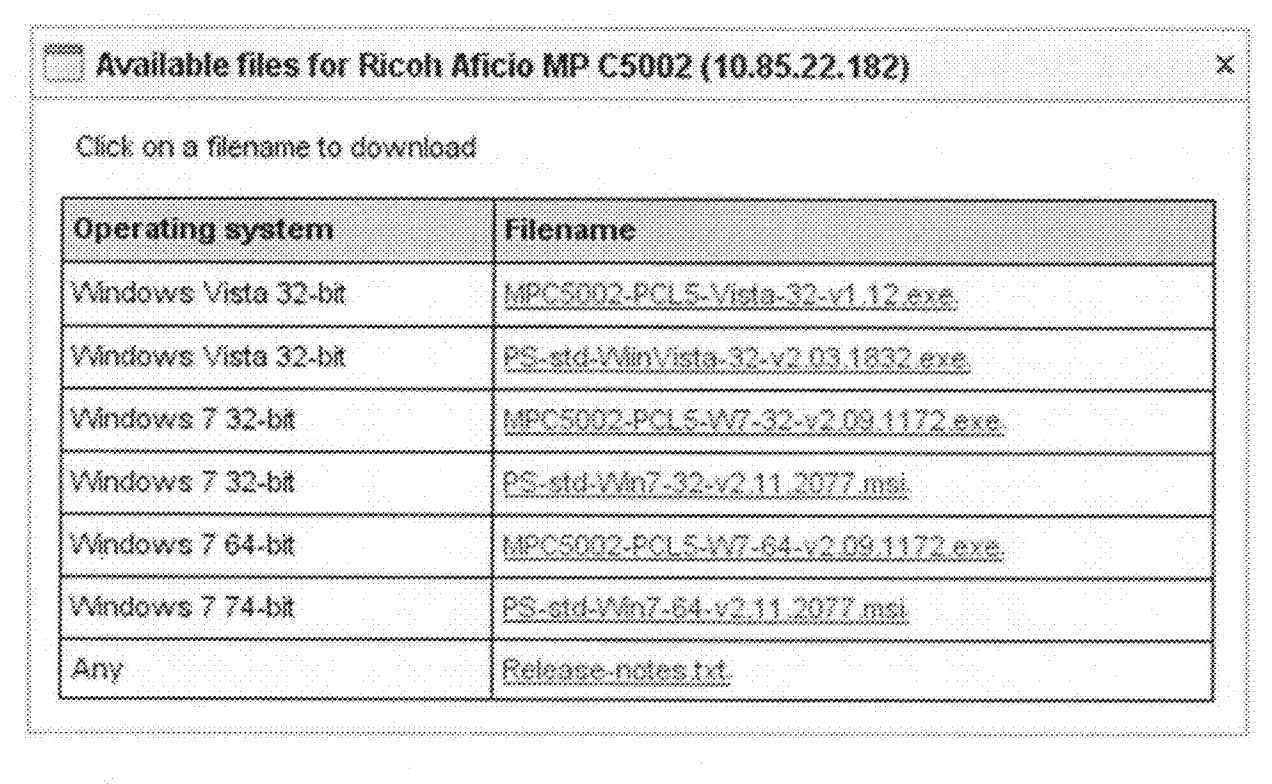

FIG. 5 illustrates such a pop-up window. As can be seen in the example of FIG. 5, the "Ricoh Aficio MP C5002" device has been selected. In the embodiment of FIG. 5, the window shows all available files for the selected device (in this case, Ricoh Aficio MP C5002). The user may then click on a particular filename to begin downloading the particular file to his or her device 200 from the device management system 100.

Any links (rather than actual files) added by the administrator as discussed with respect to FIG. 12 below, may be displayed identically, but the target will be the link location, as defined by the administrator, rather than the location of the driver package or file stored at the device management system 100. Thus, if the package is an external link, the Uniform Resource Locator (URL) will be opened upon clicking the link.

However, if the driver is a modular driver, clicking the link will download a SetupPrinter.exe file. Running the file will install the driver, install the port, and install the print queue. Note that, in one embodiment, a modular driver package differs from a device driver package in that the modular driver package may be uploaded directly to device management system 100, whereas the device driver package is first created through a separate tool (for example, Ricoh's Printer Driver Packager NX). Ricoh's Printer Driver Packager NX tool allows the device driver package to be modified so as to change the default settings of the driver (e.g., color vs. monochrome, duplexing, tray, finishing options, etc.).

Figure 6:
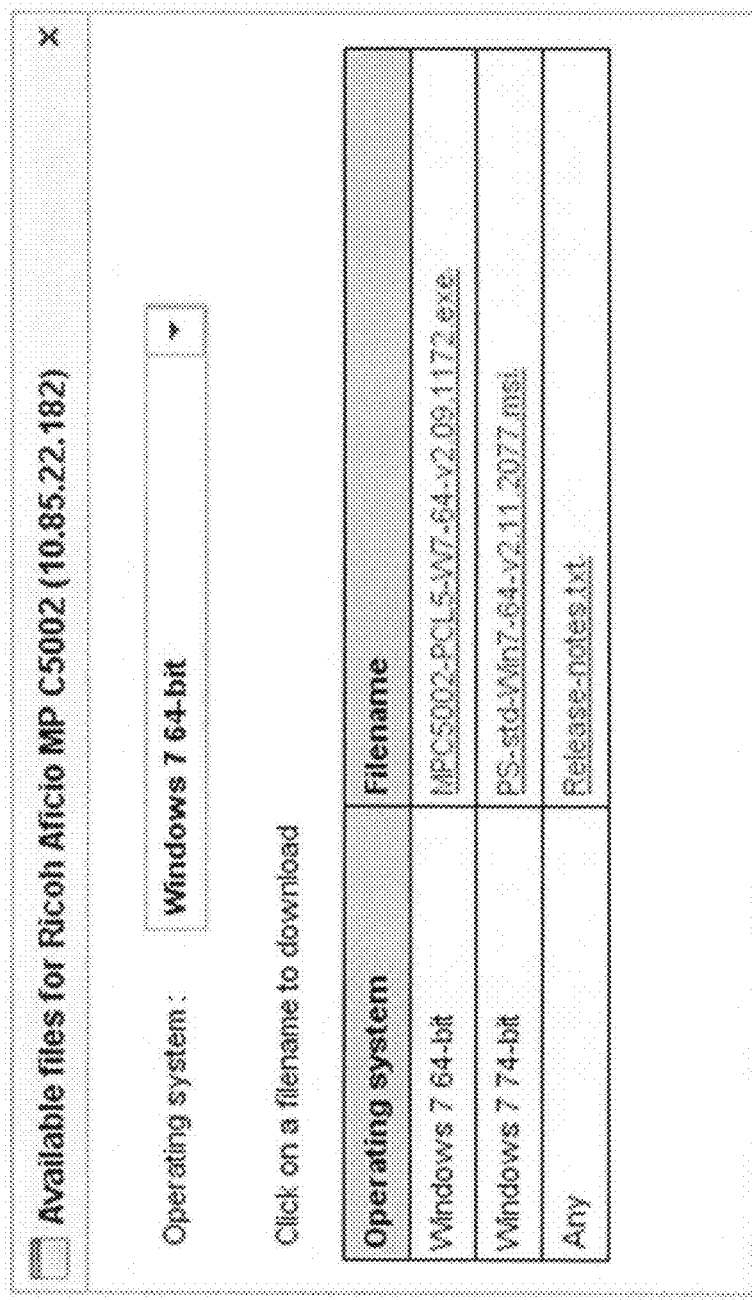

In one embodiment, in response to the user selecting a device, the user's operating system on device 200 may be automatically detected and a pop-up window as shown in FIG. 6 may be displayed by the device management system 100. As illustrated in FIG. 6, the operating system is shown as "Windows 7 64-bit" in the drop-down list indicating that this is the detected operating system of user's device 200. Hence, only the files compatible with the operating system are displayed. Note that selecting a different operating system from the drop-down list results in files compatible with that particular operating system being displayed.

FIGS. 7-14 illustrate screens via which a driver (modular driver or device driver) package may be added to a particular device or group of devices by the administrator. Thus, in one embodiment, this functionality is provided only to the administrator (only one logged-in as an administrator may access these screens).

Figure 7:
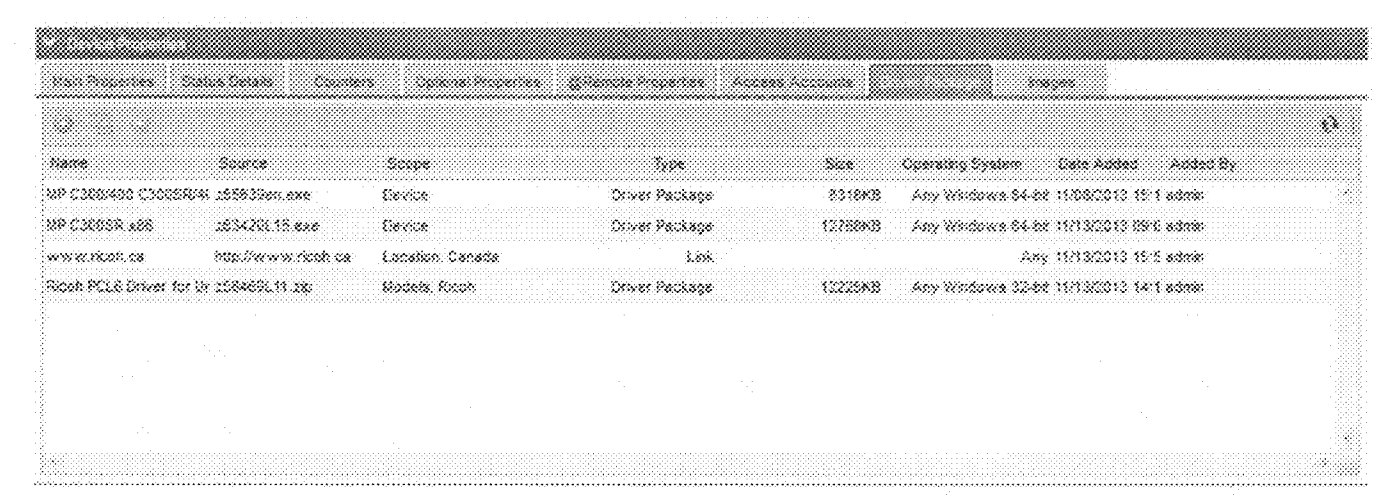

If logged-in as an administrator and the administrator selects a device from the screen illustrated in FIG. 3A or 3B, a device properties screen that includes various tabs may be displayed as shown in FIG. 7. In one embodiment, the device properties screen includes the following tabs: Main Properties; Status Details, Counters; Optional Properties; @Remote Properties; Access Accounts; Driver Package; and Images.

Selecting the "Driver Package" tab displays the following:

1) Name—The name of the package;

2) Source—The source file or URL;

3) Scope—At what level is the package assigned (device level or from a group);

4) Type—The type of driver package (Link, Driver, Other file);

5) Size—The size of the driver package;

6) Operating System—The operating system on which the package is supported;

7) Date added—when was the package added; and

8) Added by—who added the package.

Table 1 provides additional details on the above items.

TABLE 1

| Item Name | Description | Additional Information |
|---|---|---|
| Name | The free-form description of the package. | |
| Source | The file name or URL. | Windows filename characters for packages, valid URL characters for URLs. |
| Scope | The set of devices for which this package is available. | "Device", "manufacturer: name" or "model: name" |
| Type | The type of the package. | "Driver package", "legacy package", "other file" or "link" |
| Size | The size of the package. | Expressed in KB. |
| Operating System | The client Operating System (OS) for which this package should be displayed. | "Windows Vista 32-bit", "Windows Vista 64-bit", "Windows 7 32-bit", "Windows 7 64-bit", "Windows 8 32-bit", "Windows 8 64-bit", "Any" |
| Date Added | The date the package was added to the system. | Formatted in user's date format. |
| Added By | The user ID of the user who added the package. | Added by. |

Table 2 shows the item name, type, description, and action and result of the screen illustrated in FIG. 7.

TABLE 2

| Item Name | Type | Description | Action and Result |
|---|---|---|---|
| Add Button (+) | Button | Add a new package or upload a driver. | |
| Edit Button | Button | Edit an existing package. | Only packages within the "Device" scope may be edited. |
| Delete Button (−) | Button | Delete a package (deleting a driver package does not delete the driver from the system, only the package since a driver can be associated with multiple devices). | Only packages within the "Device" scope can be deleted. |
| Refresh Button | Button | Refreshes the list grid. | |

Figure 8:
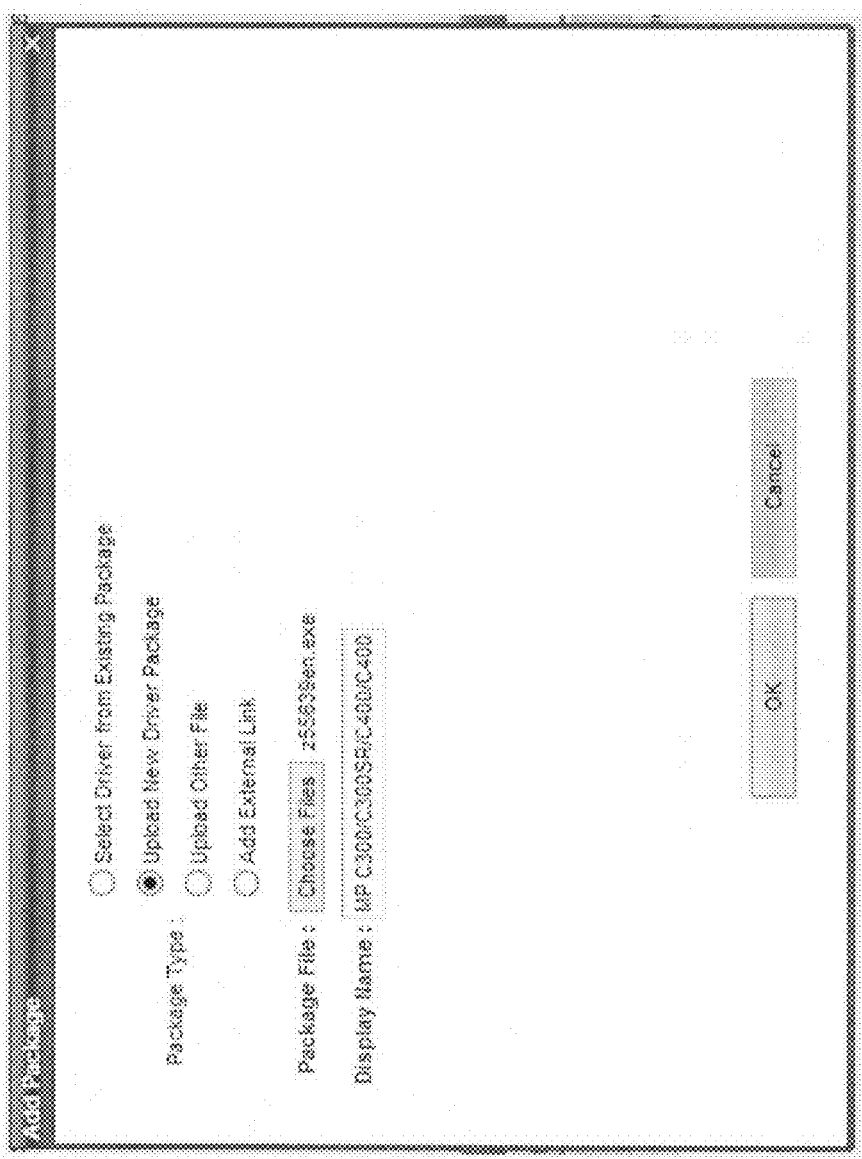
Figure 9:
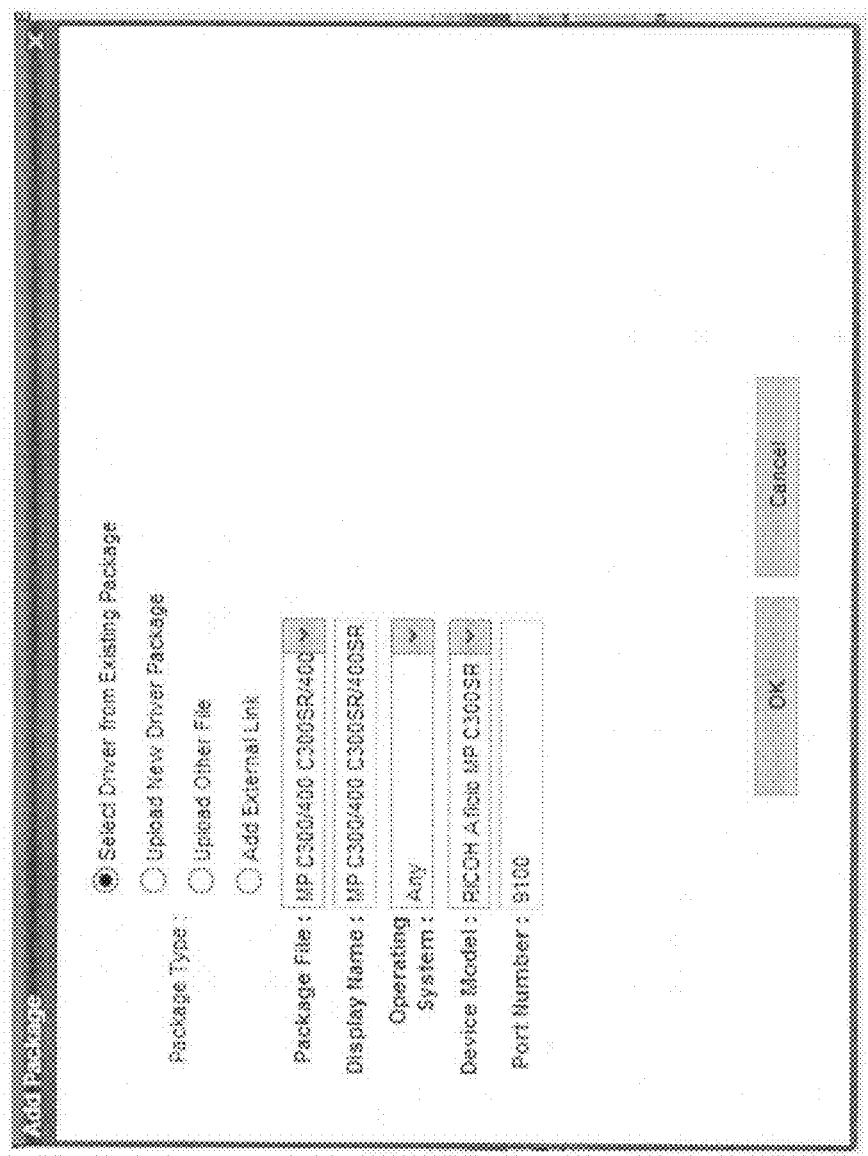

When the add button (+) shown in FIG. 7 is selected by the administrator, an add package screen is displayed by the device management system 100, as shown in FIG. 8. The screen illustrated in FIG. 8 is used to upload a new driver. Using the screen of FIG. 8, the uploading of a driver is carried out by selecting the "Upload New Driver Package" radio button. Selecting the driver and uploading it will create an entry in the modular_driver table (shown in FIG. 15) but will not associate the driver with the device. To associate the driver with the device, after uploading, the administrator again clicks the add button (+) of FIG. 7 and then selects "Select Driver from Existing Package," as shown in FIG. 9. The package will be available with the list of models available from the driver.

Figure 15:
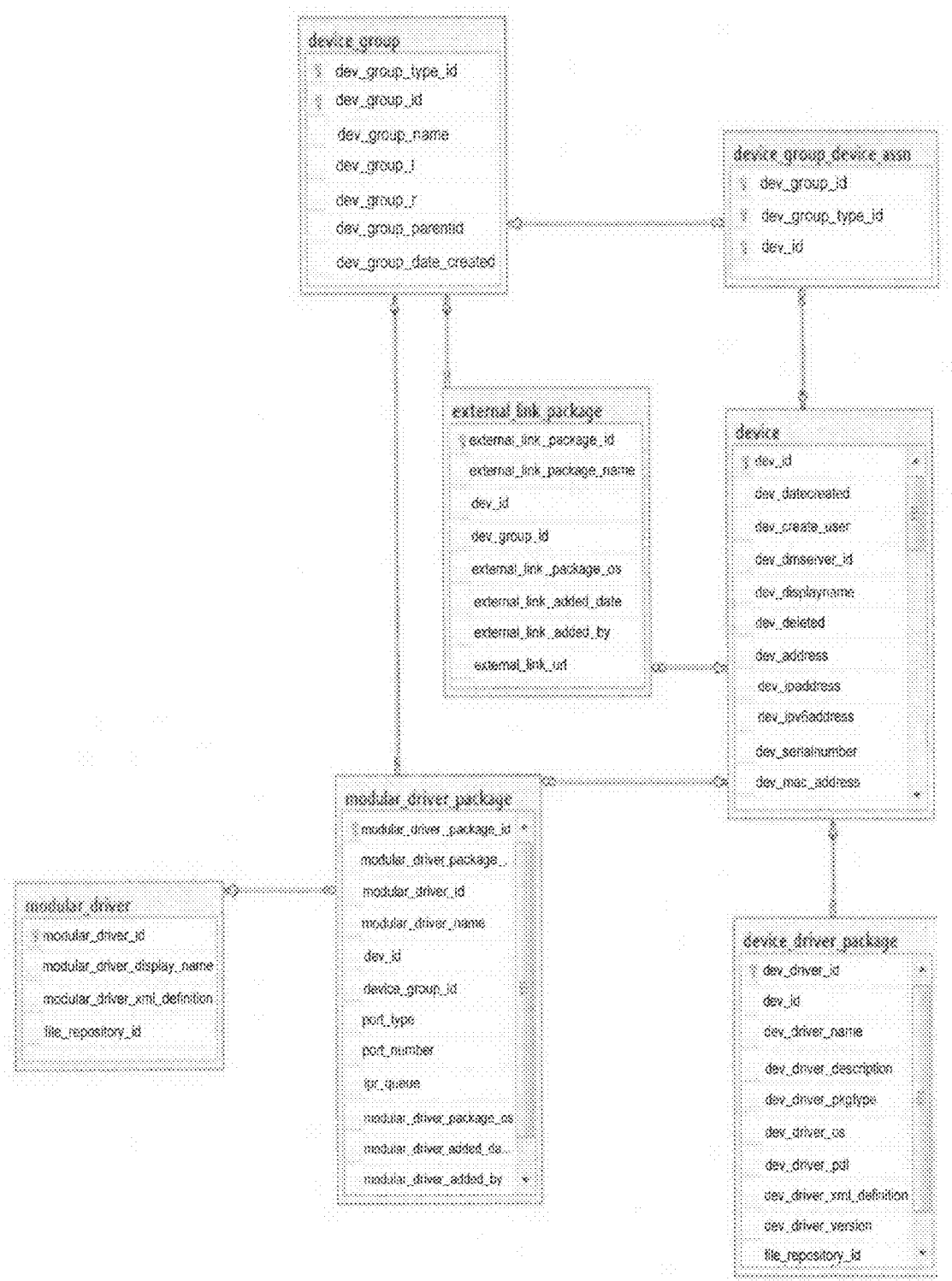
FIG. 15 illustrates various tables stored at the device management system.

Uploading a driver takes the following actions at the device management system 100: 1) driver is unzipped (from zip file or self-extracting exe); 2) driver INF file is parsed for model information; 3) file repository has original zip file or self-extracting exe file added; and 4) modular_driver table is added with driver/model information and file_repository association (see FIG. 15).

FIG. 9 illustrates a screen for assigning an existing driver package to a device 300. Selecting an existing package (by selecting "Select Driver from Existing Package") lists the device driver packages and the modular driver packages (see FIG. 15) in the "Package File" dropdown, as shown in FIG. 9. Selecting a package populates the "Device Model" dropdown. The "Port Number" specifies the RAW port on which the printer can be written to for printing jobs.

Figure 10:
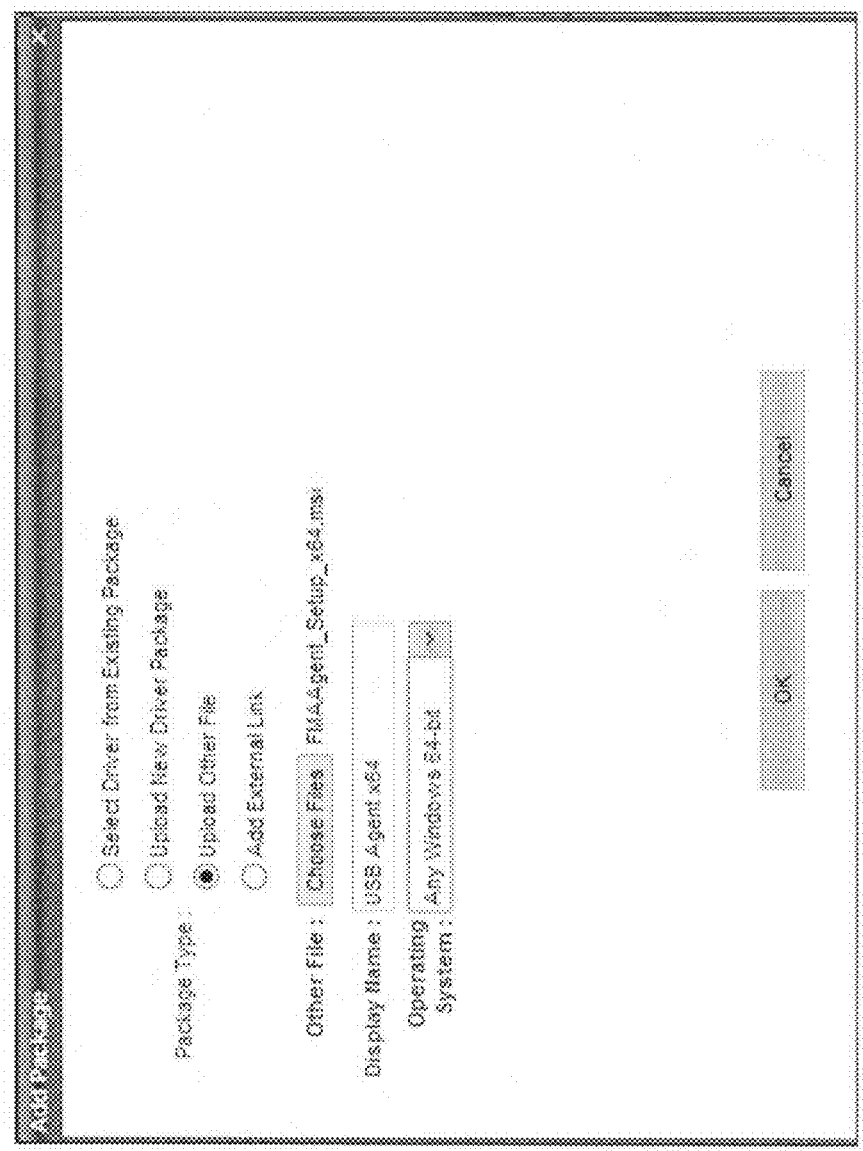
Figure 11:
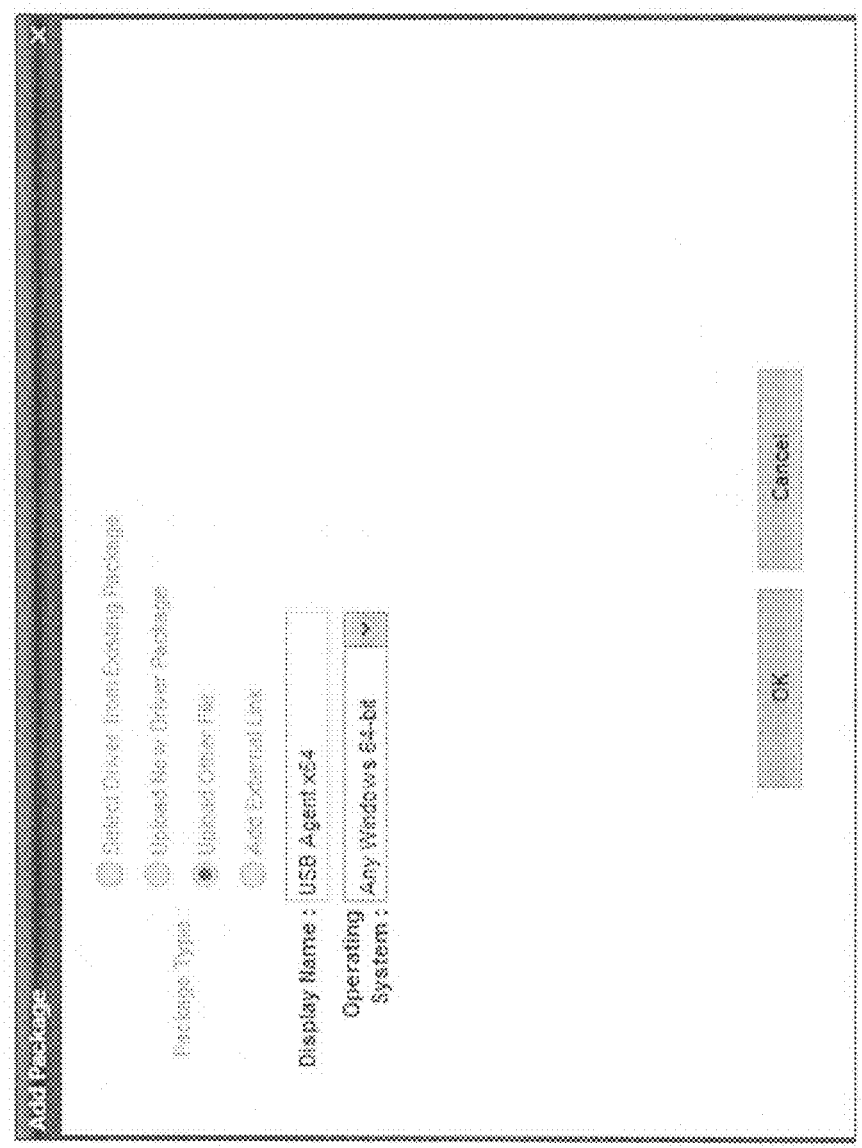

The screen illustrated in FIG. 10 shows uploading of another file. Selecting "Upload Other File" allows for any file to be associated with a device 300. Meanwhile, editing an existing "Other File" package only allows for the "Display Name" and "Operating System" to be changed, as shown in FIG. 11. The aforementioned file may be any kind of file (audio, video, text, etc.) or document. In one embodiment, such file may be a PDF document or video walkthrough with instructions for using device 300 (e.g., how to configure certain finishing options, etc.).

Figure 12:
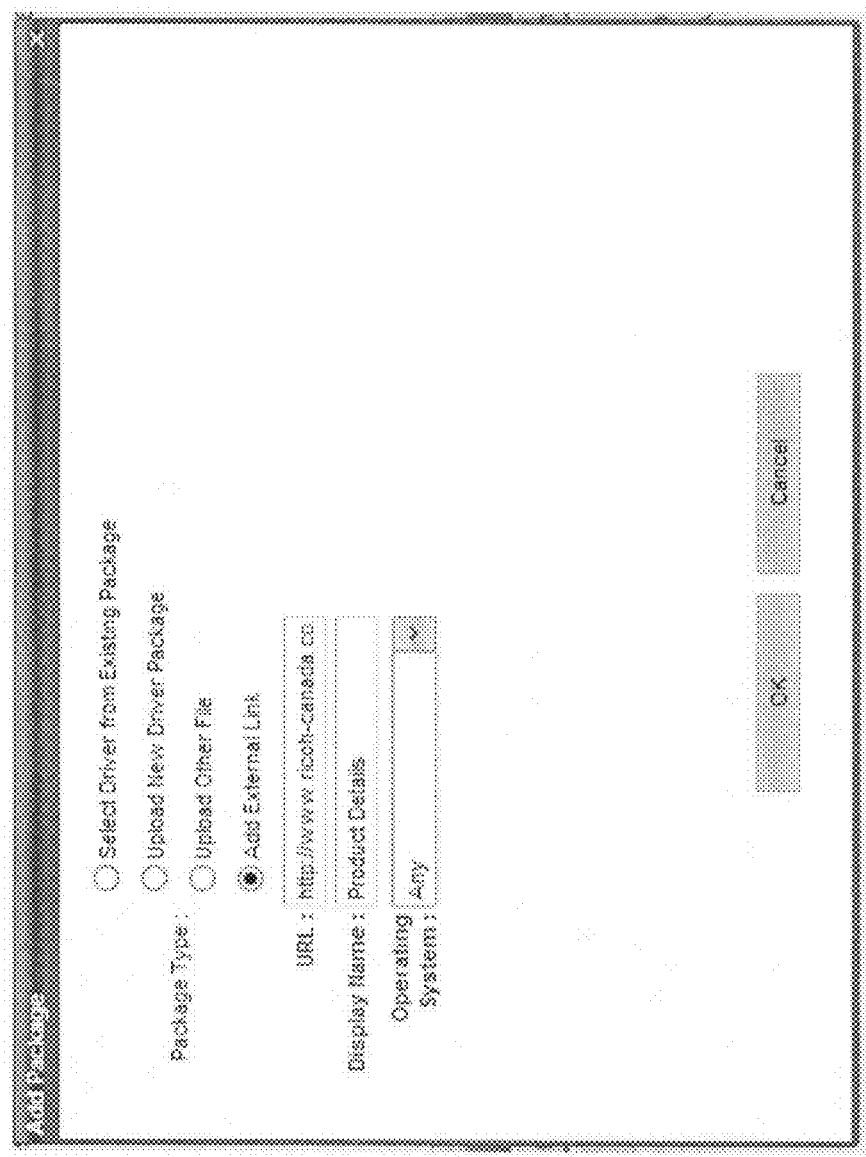

The screen illustrated in FIG. 12 is used to add an external link. Selecting "Add External Link" allows for associating a link with a device 300. As can be seen in FIG. 12, the link is specified in the "URL" field. In an embodiment, this link may point to where a particular driver can be downloaded from.

Figure 13:
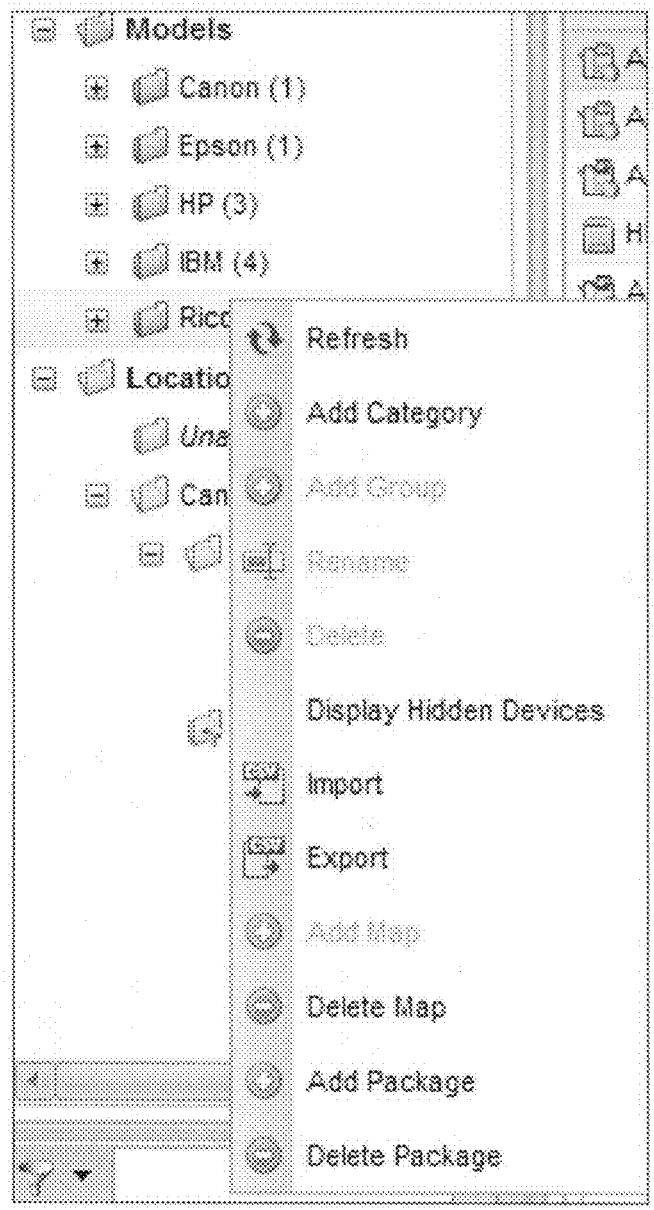

The screen illustrated in FIG. 13 shows a pop-up window that includes settings associated with device groups. One may navigate to this screen by selecting "Models" from the "Browse by" window in FIG. 3A, and then right-clicking on a device group ("Ricoh" in FIG. 13). In doing so, the device management system 100 displays the pop-up window which includes various settings, including a setting that allows driver packages to be associated at a device group level (i.e., with a plurality of devices).

Among the menu items shown in the pop-up window are "Add Package" and "Delete Package." The "Add Package" item allows a package to be added to the group ("Ricoh" in FIG. 13). When the administrator selects "Add Package," the same screen (as shown in FIGS. 8-12) that is displayed for adding packages to a specific device is also displayed for adding a package to a group of devices. Accordingly, the same functionality exists: 1) uploading a new driver; 2) associating an existing driver package with a device group; 3) uploading and associating an "other" file with a device group; and 4) adding an external link to a device group, as discussed above with respect to FIGS. 8-12.

Figure 14:
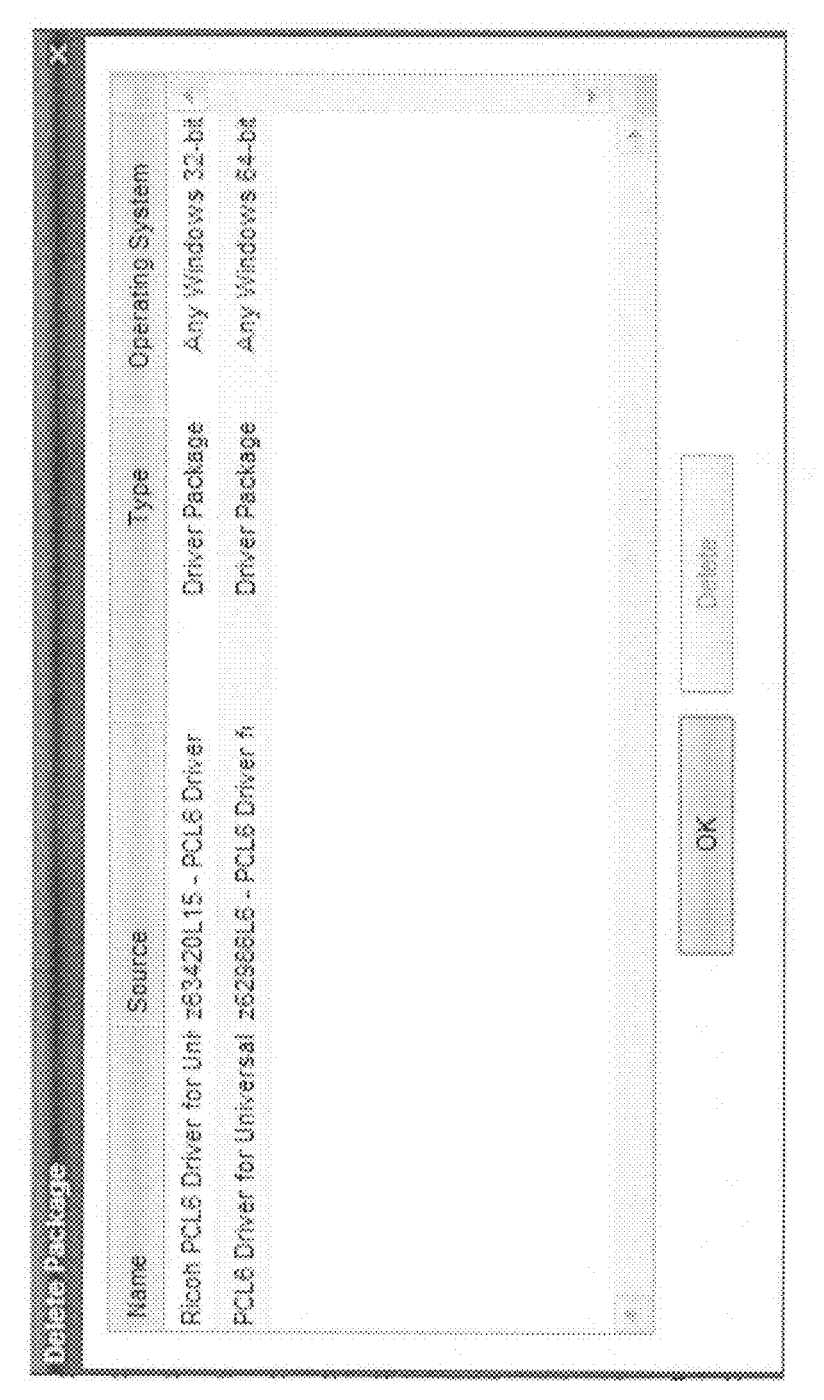

The "Delete Package" item allows a package to be deleted. When the administrator selects "Delete Package," a screen for deleting packages is displayed, as shown in FIG. 14. Selecting an item of the items displayed in FIG. 14 and selecting a "Delete" operation will delete the package from the device group. Again, deleting a driver package (modular driver package or device driver package) does not delete the driver from the system, only the package since a driver can be associated with multiple devices.

Thus, in one embodiment, the drivers themselves do not get deleted when disassociated from a device or group through the deletion discussed above (even if there is only one association).

In one embodiment, however, another option may be available to allow deletion of the actual drivers themselves from the system 100, as well as allow deletion of a file (e.g., firmware, SDK applications, etc.).

In one embodiment, if the screen of FIG. 14 displays a "link" or "other file," then selecting that link or file and performing a "Delete" operation would actually delete the link or file from the system 100.

FIG. 15 illustrates a data model for a database of the device management system 100. In other words, FIG. 15 shows how data is stored and associated therewith in memory. This enables the performance of the various embodiments described herein, including the assigning of a driver to a group of devices. The data of FIG. 15 may be stored at any memory (discussed, for example, with respect to FIG. 18) of the device management system 100 or a memory external to the device management system 100. As can be seen in FIG. 15, a device group (device_group) may be associated with zero, one, or more: modular driver package (modular_driver_package), external link package (external_link_package), and device group association (device_group_device_assn).

As further illustrated in FIG. 15, a device may be associated with zero, one, or more device group association (device_group_device_assn), external link package (external_link_package), modular driver package (modular_driver_package), and device driver package (device_driver_package). Further, a modular driver (modular_driver) may be associated with zero, one, or more modular driver package (modular_driver_package). Each of the aforementioned categories includes keys (primary and foreign) and attributes (all listed within each table), which are also illustrated in FIG. 15.

Note that, a primary key is used as an identifier for a table to uniquely identify an entry, and a foreign key is used to link an entry in one table to a unique entry in another table. In addition, the lines between the tables in FIG. 15 indicate that there is a foreign key linking the respective tables. For example, the modular_driver_package links either to device_ group via the device_group_id or to device via the dev_id. Similar concepts apply to the other tables shown in FIG. 15.

In one embodiment, the device_group table is created in response to/at a time when a device group is created. In one embodiment, the device_group_assn table entries are created or updated at a time when devices are assigned to a group. In one embodiment, the device table entries are created at a time when a device is added to the device management system 100.

In one embodiment, the modular_driver table entries are created at a time when a modular driver is uploaded to the device management system 100. In one embodiment, the package tables (i.e., external_link_package, modular_driver_package, and device_driver_package) are created at a time when a package is assigned to a device or a device group.

The following is an example of an application of the embodiments discussed herein. In this example, Company A purchases devices from Manufacturer C and Manufacturer D. For Company A's corporate use, the company needs to standardize on specific drivers. Thus, Company A performs testing of drivers for devices and allows only certain drivers to go through quality control to make sure that all work (for example, all fonts work correctly and there are no bugs, etc.).

Company A tests, for example, Driver E. Based on such testing, Company A decides to use Driver E for all Model F devices of Manufacturer C. Company A would like to make Driver E available for all end-users to be able to use such driver. Thus, an administrator at Company A would package Driver E up onto the device management system 100 and the device management system 100 would automatically associate the driver with the Model F device group.

Thus, all Model F devices already installed would have this driver available. Moreover, as a new Model F device is installed, the driver would be already in the system. Thus, in one embodiment, when a new device is added to a group, the driver or drivers already associated with that group will automatically be associated with the new device.

Below is an example of how an administrator at Company A (in conjunction with the device management system 100), may assign Driver E to all Model F devices.

The administrator opens up a web-browser or starts an application and the device management system 100 displays the log-in screen shown in FIG. 2. Next, the administrator selects an administrator profile, enters a user name and a password, and submits the information to the device management system 100. Once successfully authenticated by the device management system 100, the device management system 100 displays a screen as shown in FIG. 3A to allow the administrator to locate a device or devices.

The administrator may select a group of devices by browsing to "Models" in FIG. 3A, for example, and then highlighting (for example, by clicking once) a particular model (for example, "Ricoh" as shown in FIG. 13). The administrator may then right-click on the highlighted model name, and as a result, the device management system 100 displays a pop-up window listing additional options, as shown in FIG. 13.

Next, the administrator may select the add package (+) button on the screen shown in FIG. 13. When the administrator performs such selection, the device management system 100 displays an "Add Package" window (as shown, for example, in FIGS. 8-12).

If the administrator selects "Upload New Driver Package," then the device management system 100 will create an entry in the modular_driver table but will not associate the driver with the device or group of devices. To do so, the administrator would have to again select the add button (+), then select "Select Driver from Existing Package," and then locate and select the particular package that was just uploaded as shown in FIG. 9.

Upon confirmation by the administrator, the device management system 100 updates the database to assign the driver (or any other information entered, as discussed with respect to FIGS. 9-12) to the particular device or group of devices. The device management system 100 performs such association of drivers/information with a device/group of devices as discussed above with respect to FIG. 15.

Figure 16:
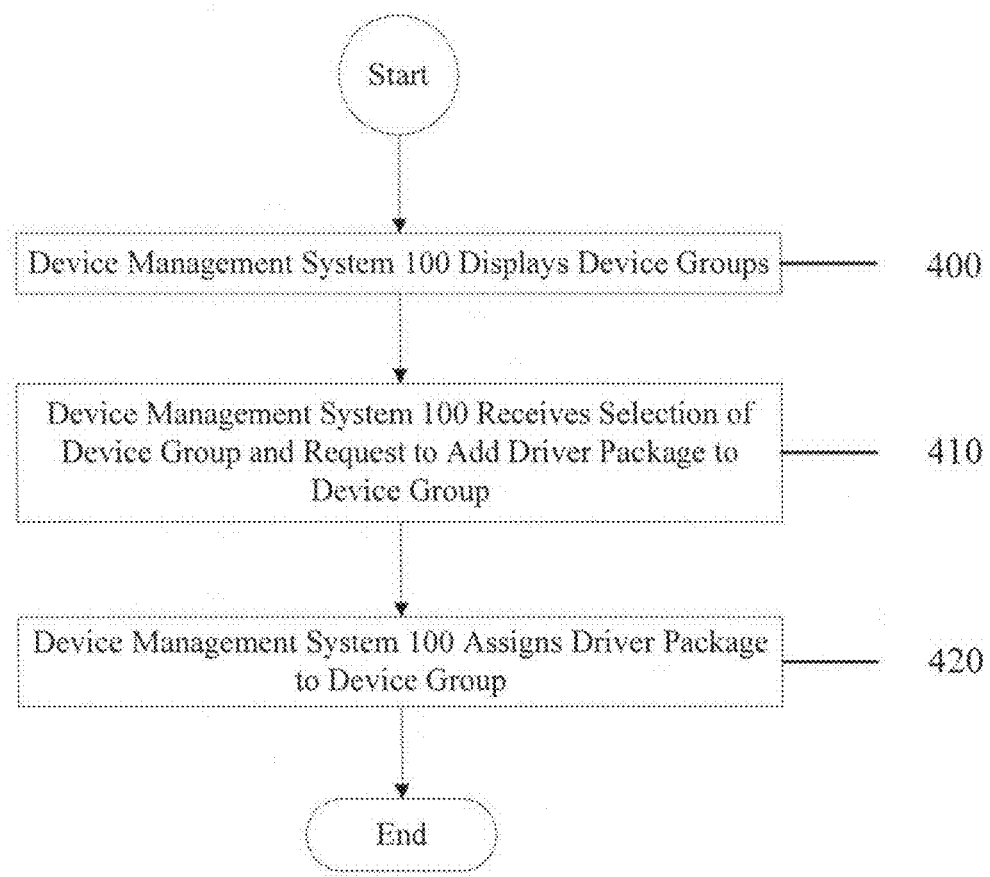
FIGS. 16 and 17 are flowcharts of processes performed by the device management system.

FIG. 16 is a flowchart of an exemplary embodiment of associating a driver package as discussed above. Note that the following process is discussed with respect to a driver package. However, the same steps would also apply to associating a file, external link, or any other information with a device group. The process of FIG. 16 is performed by the device management system 100.

First, at step 400, the device management system 100 displays a plurality of device groups, each of the plurality of device groups including a plurality of devices. An example of such displaying may be seen in FIG. 13 under "Models."

Next, at step 410, the device management system 100 receives a selection of a device group from the displayed device groups. The example in FIG. 13 shows that a selection of group "Ricoh" has been input by the administrator.

Also at step 410, the device management system 100 receives a request to add a driver package to the selected device group. From the example in FIG. 13, the administrator selects the "Add Package" button, and then proceeds to add a driver package (or file or link) as discussed with respect to FIG. 8-12.

Finally, at step 420, the device management system 100 assigns the driver package to a device group by associating the driver package with the group in a memory of the device management system 100. Such concept is shown in FIG. 15.

As can be seen in the example of FIG. 15, the device management system 100 inserts the device_group_id in the modular_driver_package.

Figure 17:
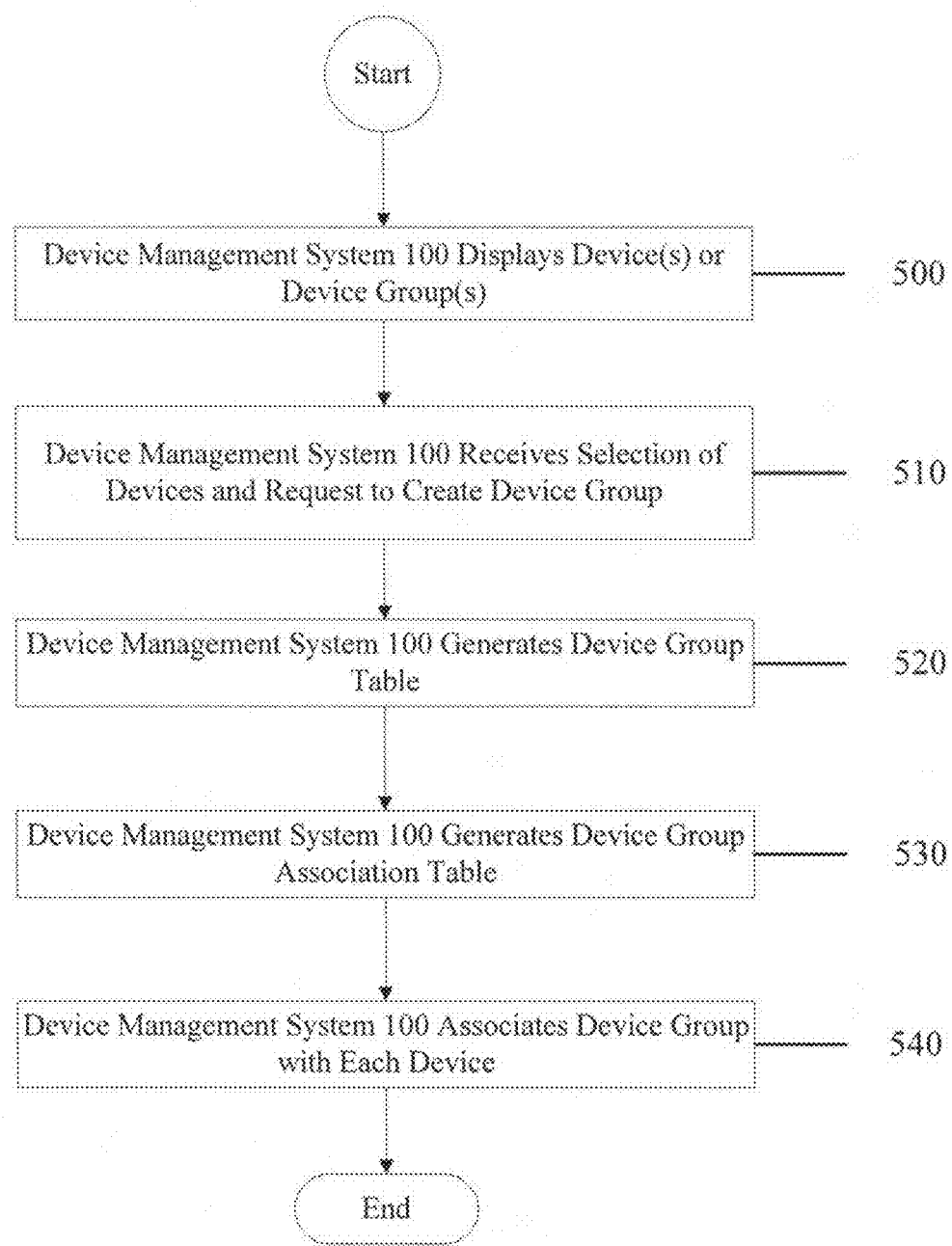

FIG. 17 is a flowchart of an exemplary embodiment of creating a group of devices performed by the device management system 100. At step 500, the device management system 100 displays one or more devices or one or more groups of devices.

At step 510, the device management system 100 receives a selection of a plurality of devices and a request to create a device group that includes the selected devices. Such selection may be performed by an administrator from a screen as illustrated in FIGS. 3A and 3B. The administrator may click on each of the devices listed or may perform a "select all" operation. Once the selection has been input, the administrator may perform a right-click operation, and the device management system 100 may thus display a pop-up window with additional setting/options. Such pop-up window may include an option to create a "New Group" or an option to add to an "Existing Group."

The administrator may then select the "New Group" option and input a new group name when prompted by the device management system 100. As a result, at step 520, the device management system 100 generates a new device_group table with the corresponding information (including, but not limited to, group type, group ID, group name, etc., shown under the device_group heading in FIG. 15).

Next, at step 530, the device management system 100 generates a device_group_device_assn table. Then, at step 540, the device management system 100 associates, in the device_group_device_assn table, the group ID with a device ID of each of the devices selected to be in the group. As can be seen in the example shown in FIG. 15, the device_group_device_assn table includes a device group ID, a device group type ID, and a device ID. Accordingly, a new device group is created by the device management system 100.

Each of the functions described in the embodiments may be implemented by one or more processing circuits. A processing circuit includes a programmed processor (for example, processor 1203 of FIG. 18), as a processor includes circuitry. A processing circuit also includes devices such as an application specific integrated circuit (ASIC) and conventional circuit components arranged to perform the recited functions.

FIG. 18 illustrates a computer system 1201 upon which embodiments of the device management system 100 described herein may be implemented. FIG. 18 also shows the hardware that may be found in the device management system 100 and the computing device 200.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The processor 1203 executes one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to another device 1217 such as a personal digital assistant (PDA), laptop computer, or cellular telephone. The device 1217 may be the computing device 200, the printing device 300, or any other device.

Obviously, numerous modifications and variations of the embodiments described herein are possible in light of the above teachings. It is therefore to be understood that within the scope of the appended claims, the invention may be practiced otherwise than as specifically described herein.

The invention claimed is:

1. An apparatus, comprising:
   processing circuitry to
   display a plurality of device groups, each of the plurality of device groups including a plurality of devices, a device group being identified by a group identification, the group identification being associated in a table with a device identification of each of the plurality of devices of the device group at a device management system,
   receive a selection of a device group of the plurality of device groups and a request to add a driver package to the device group,
   assign the driver package to the device group by associating the driver package with the device group,
   display a pop-up menu in response to selection of an icon representing a particular device group of the plurality of device groups, the pop-up menu including an add icon to add a package to the particular device group, a delete icon to delete the particular driver package from the particular device group, and a delete map icon to delete a floor map indicating physical locations of devices on a floor of a building, and
   in response to receiving, via selection of the delete icon on the pop-up menu, a request to delete a particular driver package, which is associated with a driver that is in turn associated with another driver package of another device group, from the particular device group of the plurality of device groups, delete the particular driver package from the particular device group and disassociate the driver from the particular device group, without disassociating the driver from the another driver package of the another device group and without deleting the driver from the device management system that stores the driver.

2. The apparatus of claim 1, wherein the processing circuitry
   associates the driver package with the device group by including a group identification of the device group in a package table.

3. The apparatus of claim 1, wherein the processing circuitry
   receives a selection of a plurality of devices and a request to create a new device group that includes the selected plurality of devices,
   generates a device group table including a group identification of the new device group,
   generates a device group association table, and
   associates, in the device group association table, the group identification with a device identification of each of the selected plurality of devices.

4. The apparatus of claim 1, wherein the processing circuitry
   receives a second selection of the device group of the plurality of device groups and a second request to add an external link package to the device group, and
   assigns the external link package to the device group by performing an association of the external link package with the device group, wherein
   the device group is associated with both the driver package and the external link package.

5. The apparatus of claim 1, wherein the processing circuitry
receives model information from a device,
determines a second group of the plurality of device groups that includes devices with same model information, and
adds the device to the second group.

6. The apparatus of claim 1, wherein the processing circuitry
associates each of the plurality of device groups with a group type identification, a group identification, a group name, and a date created.

7. The apparatus of claim 1, wherein the plurality of devices are at least one of printers and multi-function peripherals (MFPs).

8. The apparatus of claim 1, wherein the processing circuitry
displays the floor map indicating physical locations of devices on a floor of a building.

9. The apparatus of claim 1, wherein the assigned driver package is associated in a package table with a group identification of the device group, a driver identification, and a device identification of each of the plurality of devices of the device group.

10. A method performed by a computing apparatus, the method comprising:
displaying a plurality of device groups, each of the plurality of device groups including a plurality of devices, a device group being identified by a group identification, the group identification being associated in a table with a device identification of each of the plurality of devices of the device group at a device management system;
receiving a selection of a device group of the plurality of device groups and a request to add a driver package to the device group;
assigning the driver package to the device group by associating the driver package with the device group;
displaying a pop-up menu in response to selection of an icon representing a particular device group of the plurality of device groups, the pop-up menu including an add icon to add a package to the particular device group, a delete icon to delete the particular driver package from the particular device group, and a delete map icon to delete a floor map indicating physical locations of devices on a floor of a building; and
in response to receiving, via selection of the delete icon on the pop-up menu, a request to delete a particular driver package, which is associated with a driver that is in turn associated with another driver package of another device group, from the particular device group of the plurality of device groups, deleting the particular driver package from the particular device group and disassociating the driver from the particular device group, without disassociating the driver from the another driver package of the another device group and without deleting the driver from the device management system that stores the driver.

11. The method of claim 10, wherein the assigning step associates the driver package with the device group by including a group identification of the device group in a package table.

12. The method of claim 10, further comprising:
receiving a selection of a plurality of devices and a request to create a new device group that includes the selected plurality of devices;
generating a device group table including a group identification of the new device group;
generating a device group association table; and
associating, in the device group association table, the group identification with a device identification of each of the selected plurality of devices.

13. The method of claim 10, further comprising:
receiving a second selection of the device group of the plurality of device groups and a second request to add an external link package to the device group; and
assigning the external link package to the device group by performing an association of the external link package with the device group, wherein
the device group is associated with both the driver package and the external link package.

14. The method of claim 10, further comprising:
receiving model information from a device;
determining a second group of the plurality of device groups that includes devices with same model information; and
adding the device to the second group.

15. The method of claim 10, further comprising:
associating each of the plurality of device groups with a group type identification, a group identification, a group name, and a date created.

16. A non-transitory computer-readable storage medium including computer executable instructions, wherein the instructions, when executed by a computer, cause the computer to perform a method, the method comprising:
displaying a plurality of device groups, each of the plurality of device groups including a plurality of devices, a device group being identified by a group identification, the group identification being associated in a table with a device identification of each of the plurality of devices of the device group at a device management system;
receiving a selection of a device group of the plurality of device groups and a request to add a driver package to the device group;
assigning the driver package to the device group by associating the driver package with the device group;
displaying a pop-up menu in response to selection of an icon representing a particular device group of the plurality of device groups, the pop-up menu including an add icon to add a package to the particular device group, a delete icon to delete the particular driver package from the particular device group, and a delete map icon to delete a floor map indicating physical locations of devices on a floor of a building; and
in response to receiving, via selection of the delete icon on the pop-up menu, a request to delete a particular driver package, which is associated with a driver that is in turn associated with another driver package of another device group, from the particular device group of the plurality of device groups, deleting the particular driver package from the particular device group and disassociating the driver from the particular device group, without disassociating the driver from the another driver package of the another device group and without deleting the driver from the device management system that stores the driver.

* * * * *